United States Patent [19]

Brown

[11] Patent Number: 5,794,227
[45] Date of Patent: Aug. 11, 1998

[54] OPTIMIZATION OF THE ORDER IN WHICH THE COMPARISONS OF THE COMPONENTS OF A BOOLEAN QUERY EXPRESSION ARE APPLIED TO A DATABASE RECORD STORED AS A BYTE STREAM

[75] Inventor: Anthony Peter Graham Brown, Crowthorne, United Kingdom

[73] Assignee: International Computers Limited, United Kingdom

[21] Appl. No.: 28,627

[22] Filed: Mar. 9, 1993

Related U.S. Application Data

[63] Continuation of Ser. No. 625,070, Dec. 10, 1990, Pat. No. 5,717,141.

[30] Foreign Application Priority Data

Dec. 23, 1989 [GB] United Kingdom ............... 8929158

[51] Int. Cl.$^6$ ........................................... G06F 17/30
[52] U.S. Cl. ............................................................ 707/2
[58] Field of Search ................................. 395/600, 800

[56] References Cited

U.S. PATENT DOCUMENTS

| | | | |
|---|---|---|---|
| 4,417,305 | 11/1983 | Berstis | 395/775 |
| 4,450,520 | 5/1984 | Hollaar et al. | 364/200 |
| 4,703,435 | 10/1987 | Darringer et al. | 364/489 |
| 4,722,071 | 1/1988 | Gates et al. | 395/700 |
| 4,769,722 | 9/1988 | Dwyer | 395/600 |
| 4,811,199 | 3/1989 | Kuechler et al. | 395/600 |
| 4,829,427 | 5/1989 | Green | 395/600 |
| 4,901,232 | 2/1990 | Harrington et al. | 395/275 |
| 4,918,593 | 4/1990 | Huber | 364/200 |
| 5,091,852 | 2/1992 | Tsuchida | 395/600 |
| 5,201,048 | 4/1993 | Coulter et al. | 395/600 |
| 5,239,663 | 8/1993 | Faudemay et al. | 395/800 |

OTHER PUBLICATIONS

Ramez Elmasri and Shamkant B. Navathe, Fundamentals of Database Systems, (Ch 18), Benjamin/Cummings, 1989.

*Primary Examiner*—Wayne Amsbury
*Attorney, Agent, or Firm*—Lee, Mann, Smith, McWilliams, Sweeney & Ohlson

[57] ABSTRACT

A database system holds data in the form of a sequence of records, each record comprising one or more fields. The database can be interrogated by a search query, which specifies a particular logical combination of comparisons to be performed on specified fields of each record. Before the search commences, the search query is compiled to produce an optimized sequence of code for search within a record. Each comparison operation is assigned a cost, reflecting the cost in time to retrieve the required fields and to perform the comparisons, and is also assigned a probability, indicating the probability that the comparison will produce a true result. Each logical operation in the search query is then processed, to find the order of handling its arguments that gives the minimum expected cost, and the arguments are re-arranged into that order.

1 Claim, 2 Drawing Sheets

5,794,227

OPTIMIZATION OF THE ORDER IN WHICH THE COMPARISONS OF THE COMPONENTS OF A BOOLEAN QUERY EXPRESSION ARE APPLIED TO A DATABASE RECORD STORED AS A BYTE STREAM

This application is a continuation of application Ser. No. 07/625,070, filed Dec. 10, 1990now U.S. Pat. No. 5,717,141.

BACKGROUND TO THE INVENTION

This invention is concerned with a method and apparatus for handling queries in database systems.

In general, a database system stores data in the form of records, each record consisting of a number of fields. One way of accessing data in such a system is to search the database for records that match a search query. The search query consists of a logical combination of comparison operations to be performed on fields of each record, a record being retrieved only if the logical combination results in a "true" value for that record.

A problem with such an arrangement is that, if a query is very complex, each record will take a long time to process, and hence the execution of the search queries will be very slow.

The object of the present invention is to alleviate this problem.

SUMMARY OF THE INVENTION

According to the invention, a database system stores a sequence of records. The database is interrogated with a search query, consisting of a logical combination of comparisons to be performed on each record. The order of the comparisons is re-arranged to optimize the execution of the search query for each record.

By optimizing the search query, the processing time for each record is reduced, and hence the overall execution speed of the query is increased.

It should be noted that the optimization of the search query is performed once only, for example as part of a query compilation process before the search is actually executed.

DESCRIPTION OF AN EMBODIMENT OF THE INVENTION

One data processing system in accordance with the invention will now be described by way of example with reference to the accompanying drawings.

Overview of the system

Figure 1:
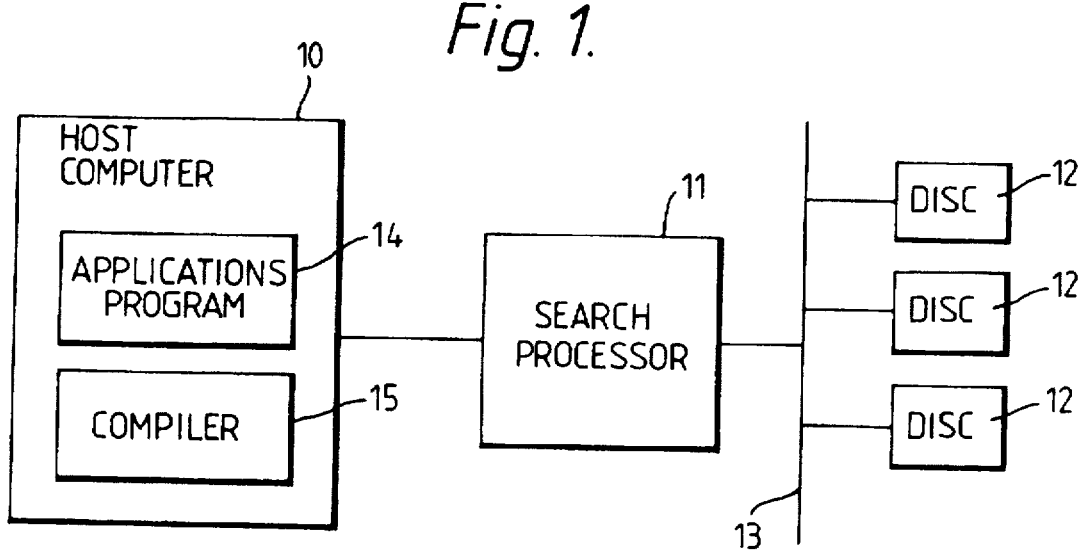
FIG. 1 shows a data processing system embodying the invention.

Referring to FIG. 1, the data processing system comprises a host computer 10 and a search processor 11. The search processor is connected to a number of disc drive units 12 by way of a bus 13.

The disc drive units 12 hold a relational database comprising one or more files. Each file consists of a sequence of records, each comprising one or more fields. Each field represents either a numerical value or text, and may be of fixed length or variable length. In the case of a fixed length field, the length of the field is the same in all records, whereas in the case of a variable length field it may vary from record to record. The length of the variable length field is computable, for example from a length code at the start of the field.

In operation, the host computer 10 performs the main processing workload of the system, consisting of one or more applications programs 14. An application program may generate search queries, specifying searches to be performed on the data base. Each search query is processed by means of a query compiler 15, to generate a sequence of search instructions, which are passed to the search processor 11 for execution.

A search query consists of a logical combination of comparison operations to be performed on each record in a file. For example, a query may be in the form ((C1 AND C2) OR C3) AND (C4 OR C5)

where C1–C5 represent individual comparison operations. Each comparison may involve comparing a specified field of the record with a predetermined search key, or may involve comparing two different fields within the record.

Query compiler

Figure 2:
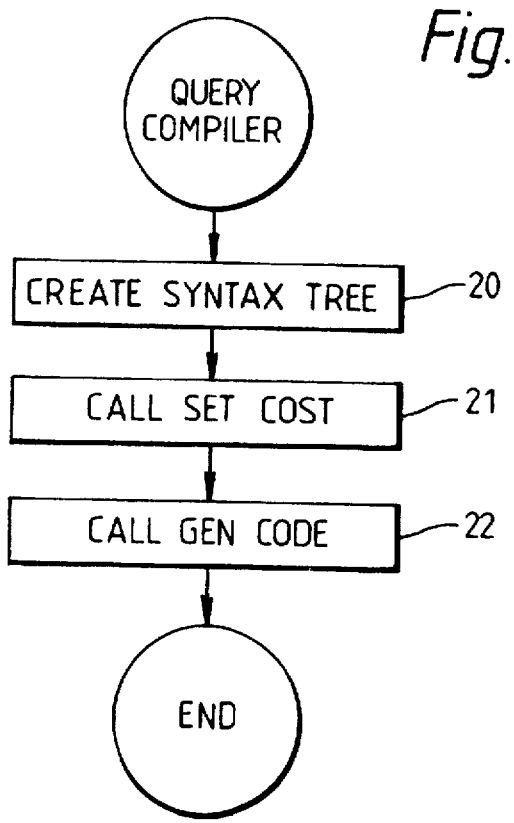
FIG. 2 is a flow chart of a compiler for optimizing a search query.

Referring now to FIG. 2, this shows the query compiler 15 in greater detail.

The first step 20 of the query compiler is to analyse the query, to create a syntax tree, representing the logical structure of the query.

Figure 3:
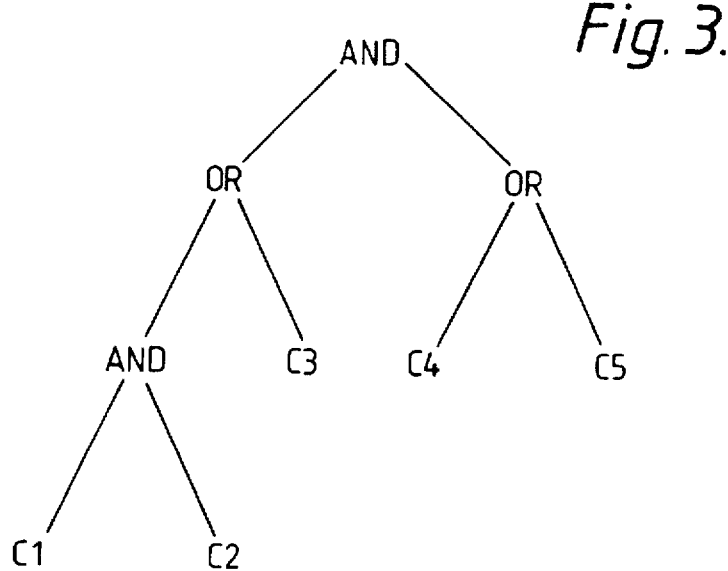
FIG. 3 is a syntax tree representing a search query.

For example, the query ((C1 AND C2) OR C3) AND (C4 OR C5)

would produce the tree structure as shown in FIG. 3.

The syntax tree consists of a set of nodes, interconnected by branches. Each node represents either a comparison (C1, C2 etc) or a logical operation (AND, OR). Each node is represented by the compiler as a data structure containing the following items:
OPERATOR TYPE (AND, OR, COMPARISON)
NUMBER OF BRANCHES (i.e. sub-nodes)
LEFTMOST BRANCH (pointer to sub-node)
OTHER BRANCHES (pointers to sub-nodes)

The next step 21 of the query compiler is to call a SET COSTS subroutine. The set costs subroutine assigns a cost and a probability to each node. The cost assigned to a node is an estimate of the expected cost (in processing time) of establishing whether that node will yield a true or false result. The probability assigned to a node is the probability of a true result.

As will be described in greater detail later, the cost of a logic node (AND, OR) depends on the costs and probabilities of its branches and on the order in which the branches are evaluated. The SET COSTS subroutine sorts the branches into the order that gives the least cost, rearranging the pointers in the syntax tree if necessary to ensure that the branches are evaluated in this order. (It is assumed that the branches of a logic node are always evaluated in order, starting from the leftmost branch). If a node has n branches, then there are n! ways of ordering the branches, and the SET COSTS subroutine determines the optimum permutation.

The next step 22 of the query compiler is to call a GEN CODE subroutine. This subroutine generates instructions for fetching the specified field or fields and performing the specified comparisons. It also inserts JUMP instructions so as to link these comparisons together in the specified logical structure.

For example, the instructions generated to implement the syntax tree structure shown in FIG. 3 are of the following form.

|   | C1 |
|---|---|
|   | IF FALSE GO TO LABEL : a |
|   | C2 |
|   | IF TRUE GO TO LABEL : b |
| :a | C3 |
|   | IF FALSE GO TO LABEL : d |
| :b | C4 |
|   | IF TRUE GO TO LABEL : c |
|   | C5 |
|   | IF FALSE GO TO LABEL : d |
| :c | RETURN "TRUE" |
| :d | RETURN "FALSE" |

Compiler routines for generating code for performing logical combinations of operations are known as such, and so it is not necessary to describe the GEN CODE subroutine in any further detail.

SET COSTS Subroutine

Figure 4:
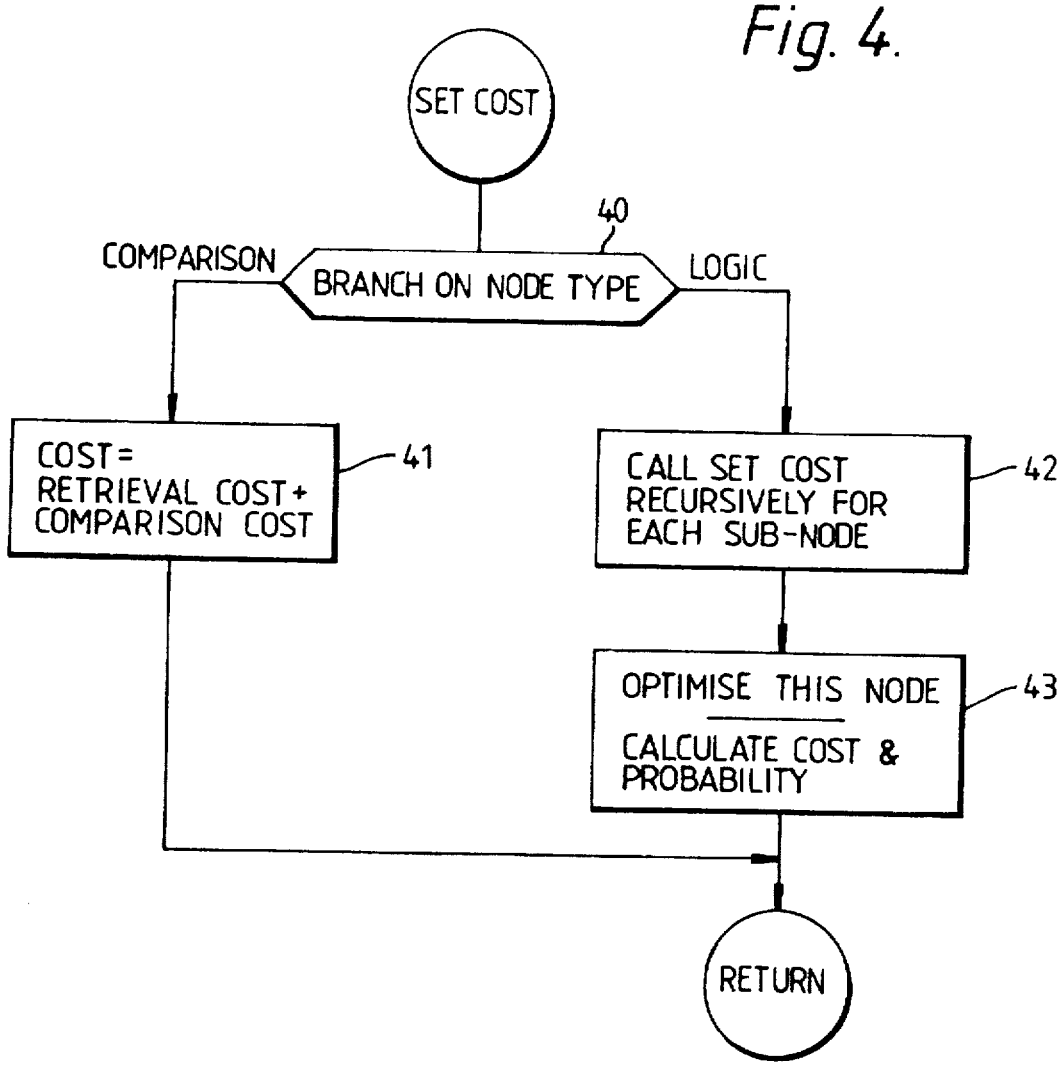
FIG. 4 shows a compiler subroutine in greater detail.

Referring now to FIG. 4, this shows the SET COSTS Subroutine in greater detail. This is initially called in respect of the root node, and then calls itself recursively, so as to scan the whole of the syntax tree, so as to process each node in the tree.

(40). The first action is to test the node type and to branch according to whether it is a comparison node or a logic node.

(41). In the case of a comparison node, the next step is to assign a cost value and a probability value to the node.

The cost of a comparison node is equal to the cost of accessing the required field(s) for the comparison, plus the cost of executing the comparison. The cost of accessing a field depends on the structure of the record. In particular, it generally takes longer to access a field that is preceded by one or more variable length fields, since it is necessary to access all those preceding fields in sequence on order to locate the start of the required field. In general, the cost of accessing a field can be estimated by a+nb where a and b are constants and n is the number of preceding variable length fields. The cost of executing a comparison depends on the comparison type. Simple comparisons such as "equals" "greater than" and "less than" can be performed rapidly and hence are assigned low cost values. More complex string comparisons such as "contains" take much longer and hence are assigned relatively higher cost values.

The probability value assigned to the comparison node is an estimate of the probability that the comparison will yield a "true" result. This estimate is made on the basis of past experience of the outcomes of comparisons. In the absence of any information about previous outcomes, predetermined default values are used. Typical values are as follows:

| Comparison type | Probability |
|---|---|
| Not equal | 0.99 |
| Greater than | 0.5 |

-continued

| Comparison type | Probability |
|---|---|
| Greater than or equal | 0.5 |
| Less than | 0.5 |
| Less than or equal | 0.5 |
| Equal | 0.01 |
| Starts with | 0.01 |
| Contains | 0.1 |
| NOT contains | 0.9 |
| Null | 0.05 |
| NOT null | 0.95 |
| Between | 0.05 |
| In set | 0.25 |

(42). If the node is a logic node, the next step in the SET COSTS routine is to make a recursive call to itself, for each branch from the node. This will result in each of the sub-nodes being processed by SET COSTS, so as to assign costs and probabilities to those sub-nodes. It will be appreciated that if any of the sub-nodes is itself a logic node, this will lead to further nested calls to SET COSTS, and so on, until a comparison node is reached.

(43). When all the branches of the logic node have been processed, the branches of the node are re-arranged to minimise the cost of the logic node, and cost and probability values are assigned.

For a logic node, the cost depends on the costs and probabilities of its branches, and on the order in which those branches are evaluated. For simplicity, the case where there are only two branches will be considered here. The extension of three or more branches will be clear.

AND Nodes

Consider an AND node having two branches with costs $c_1$, $c_2$ and probabilities $p_1$, $p_2$. If branch 1 is evaluated first, then the expected cost is $c_1 + p_1 . c_2$ whereas is branch 2 is evaluated first, the expected cost is $c_2 + p_2 . c_1$ The SET COSTS routine determines which of these two possible orders of evaluation gives the least cost and, if necessary, swaps over the pointers in the syntax tree structure, so that the branch with the least cost becomes the leftmost branch and hence is evaluated first.

The cost assigned to the node is this least cost value.

Assuming that the results of the comparisons are statistically independent, the probability assigned to the AND node is $p_1 . p_2$.

OR node

Consider an OR node having two branches with costs $c_1$, $c_2$ and probabilities $p_1$, $p_2$. If branch 1 is evaluated first, the expected cost is:

$c_1 + (1-p_1) c_2$.

if, on the other hand, branch 2 is evaluated first, the expected cost is:

$c_2 + (1-p_2) c_1$.

As before, SET COSTS determines the order of evaluation which gives the least cost, and swaps over the pointers if necessary, to ensure that the least cost branch is evaluated first.

Assuming the comparisons are statistically independent, the probability assigned to the OR node is:

$$p1+p2-p1 \cdot p2.$$

I claim:

1. A database system comprising:

(a) data storage means for storing a database comprising a sequence of records, each record comprising a plurality of record fields, (b) a host computer for generating a search query comprising a logical combination of comparison operations in a predetermined order, at least some of said comparison operations comprising a comparison between a predetermined search key and a predetermined record field, (c) compilation means in the host computer, for preprocessing the search query by changing the order of said comparison operations within said logical combination, to thereby generate a modified search query comprising said logical combination of comparison operations in a modified order, with a substantially minimized expected cost of applying said modified search query to any individual one of said records, and (d) dedicated search processor means, connected to the host computer and to the data storage means, for receiving the modified search query from the host computer and for applying said modified search query to each individual record in the database in turn to determine which of the records satisfy said modified search query.

* * * * *